(12) United States Patent
Zhu

(10) Patent No.: US 11,567,506 B2
(45) Date of Patent: Jan. 31, 2023

(54) SPEED PLANNING GUIDANCE LINE FOR MILD SLOW DOWN

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 502 days.

(21) Appl. No.: 16/730,181

(22) Filed: Dec. 30, 2019

(65) Prior Publication Data
US 2021/0200231 A1    Jul. 1, 2021

(51) Int. Cl.
*G05D 1/02* (2020.01)
*G05D 1/00* (2006.01)
*B60W 30/18* (2012.01)
*B60W 50/00* (2006.01)

(52) U.S. Cl.
CPC ......... *G05D 1/0223* (2013.01); *B60W 30/181* (2013.01); *G05D 1/0088* (2013.01); *B60W 2050/0019* (2013.01); *B60W 2520/10* (2013.01); *B60W 2720/10* (2013.01); *G05D 2201/0213* (2013.01)

(58) Field of Classification Search
CPC ............... G05D 1/0223; G05D 1/0088; G05D 2201/0213; B60W 30/181; B60W 2050/0019; B60W 2050/10; B60W 2720/10
See application file for complete search history.

(56) References Cited

U.S. PATENT DOCUMENTS

2016/0101780 A1* 4/2016 Park ................ B60W 50/14
701/70
2019/0367022 A1* 12/2019 Zhao ............... B60W 30/18154

* cited by examiner

*Primary Examiner* — Calvin Cheung
(74) *Attorney, Agent, or Firm* — Womble Bond Dickinson (US) LLP

(57) ABSTRACT

A method, apparatus, and system for planning a deceleration trajectory based on a natural deceleration profile for an autonomous driving vehicle (ADV) is disclosed. In one embodiment, in response to a request for driving in a natural deceleration mode, a current speed of the ADV is determined. A speed guideline is generated based on a predetermined natural deceleration profile associated with the ADV in view of the current speed of the ADV. A speed planning operation is performed by optimizing a total cost function based on the speed guideline to determine speeds of a plurality of trajectory points along a trajectory planned to drive the ADV. A number of control commands are generated based on the speed planning operation to control the ADV with the planned speeds along the trajectory, such that the ADV naturally slows down according to the predetermined natural deceleration profile.

20 Claims, 10 Drawing Sheets

SPEED PLANNING GUIDANCE LINE FOR MILD SLOW DOWN

TECHNICAL FIELD

Embodiments of the present disclosure relate generally to operating autonomous vehicles. More particularly, embodiments of the disclosure relate to planning a natural deceleration of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A human driver may slow down the vehicle simply by releasing the accelerator pedal without engaging any brake. Such a slowdown may be referred to hereinafter as a natural deceleration. It is generally difficult for an autonomous driving vehicle to plan for and execute a natural deceleration. As a result, passenger comfort may be negatively impacted.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
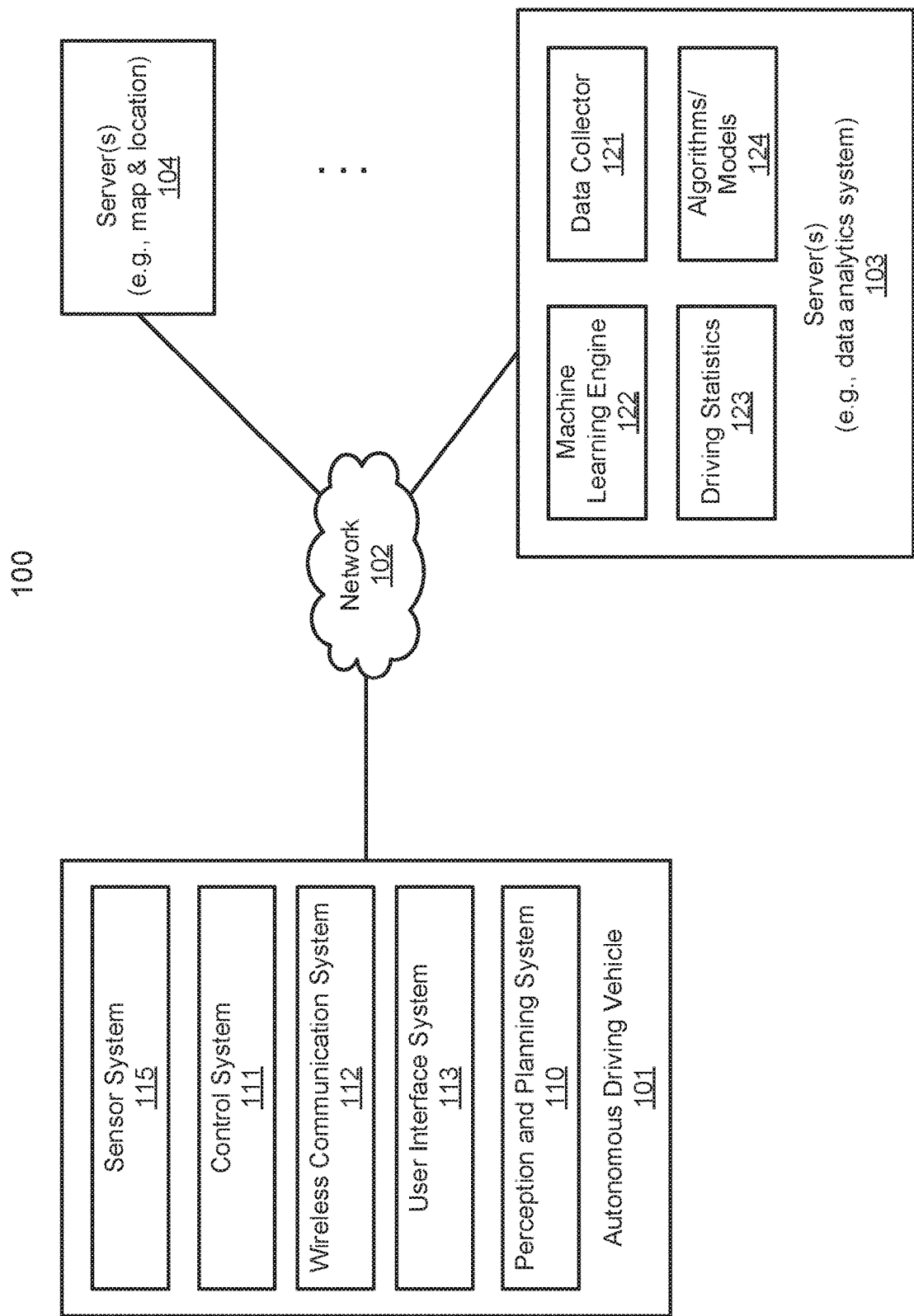
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

It is generally difficult for an autonomous driving vehicle to plan for and execute a natural deceleration. A typical autonomous driving system separates planning and control in different modules. As the natural deceleration profile is not taken into consideration according to conventional planning methods, the planned trajectory rarely results in a control behavior that is similar to the natural deceleration that a human driver would often perform. For example, a brake signal would be generated if the planned trajectory calls for a deceleration faster than the natural deceleration, and an acceleration signal would be generated if the planned trajectory calls for a deceleration slower than the natural deceleration.

According to some embodiments, a method, apparatus, and system for planning a deceleration trajectory based on a natural deceleration profile for an autonomous driving vehicle (ADV) is disclosed. In response to a request for driving in a natural deceleration mode, a current speed of the ADV is determined. A speed guideline is generated based on a predetermined natural deceleration profile associated with the ADV in view of the current speed of the ADV. A speed planning operation is performed by optimizing a total cost function based on the speed guideline to determine speeds of a plurality of trajectory points along a trajectory planned to drive the ADV. A number of control commands are generated based on the speed planning operation to control the ADV with the planned speeds along the trajectory, such that the ADV naturally slows down according to the predetermined natural deceleration profile.

In one embodiment, the predetermined natural deceleration profile is generated by allowing a sample vehicle that is of a same type as the ADV to naturally decelerate under neutral road conditions (e.g., on a flat, well-surfaced road) from a maximum speed (e.g., 150 km/h) to a full stop without engaging either an accelerator or a brake, and measuring and recording a time-speed relationship during the natural deceleration. In one embodiment, the predetermined natural deceleration profile comprises a reference line (e.g., a curve) that approximately represents the recorded time-speed relationship during the natural deceleration.

In one embodiment, generating a planned trajectory that minimizes the total cost function comprises using Quadratic programming (QP) to minimize the total cost function. In one embodiment, the total cost function further comprises a total path cost function. In one embodiment, the total speed cost function comprising at least an acceleration cost term, a jerk cost term, and an obstacle cost term when the ADV is planned to be in a speed-up state.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
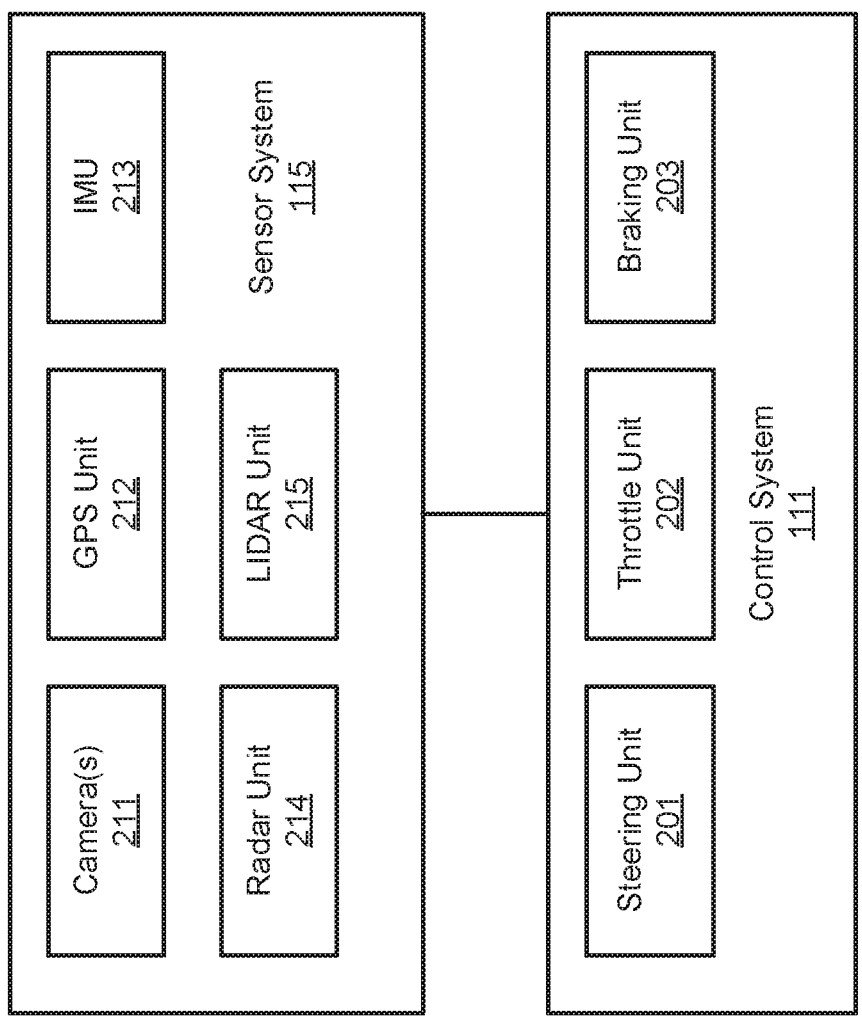
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include natural deceleration profiles for different types of vehicles, which may be utilized for speed planning during a natural deceleration driving scenario. Algorithms 124 can then be uploaded on ADVs to be utilized during autonomous driving in real-time.

Figure 3A:
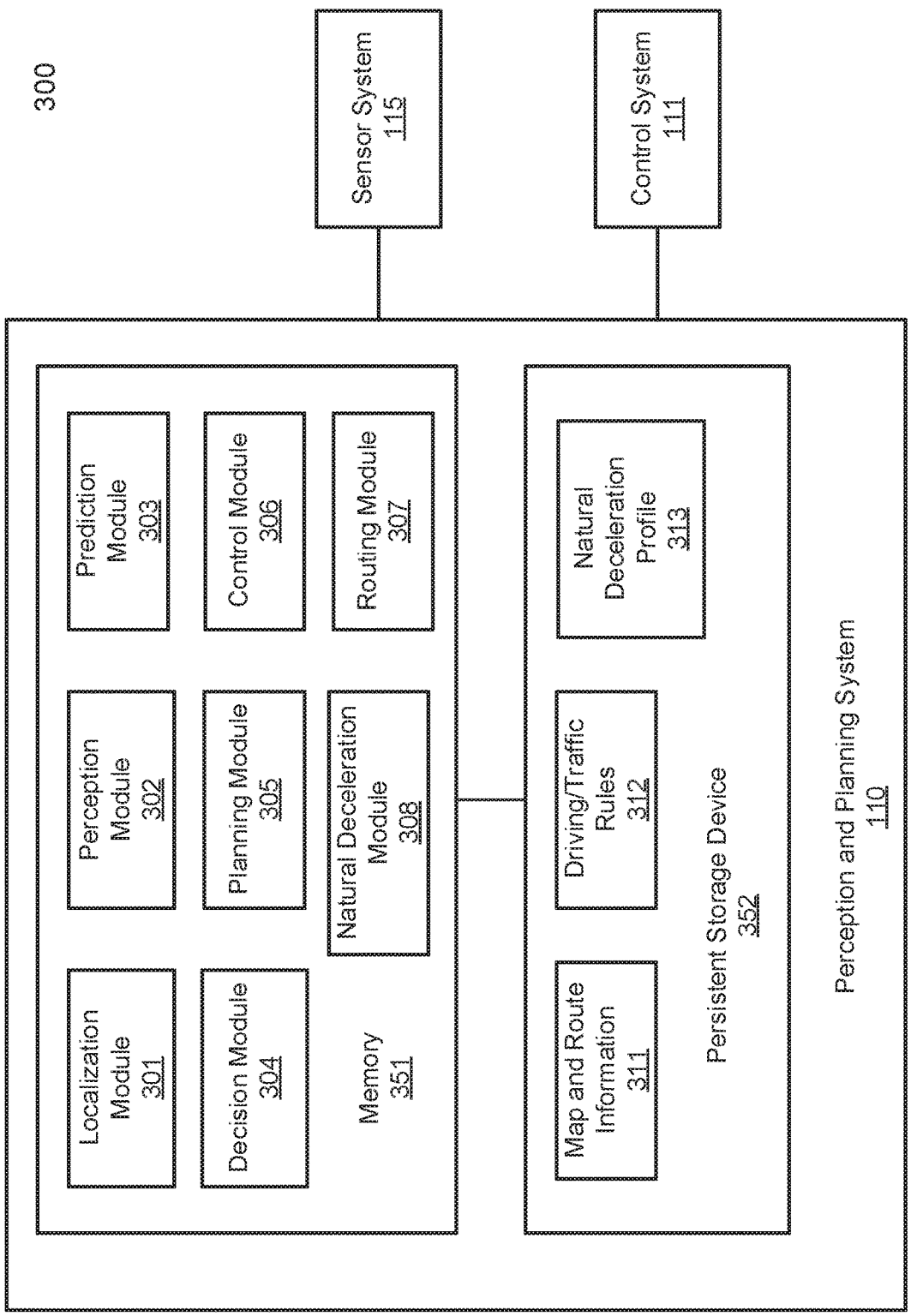
FIGS. 3A-3B are block diagrams illustrating an example of a perception and planning system used with an autonomous vehicle according to one embodiment.
Figure 3B:
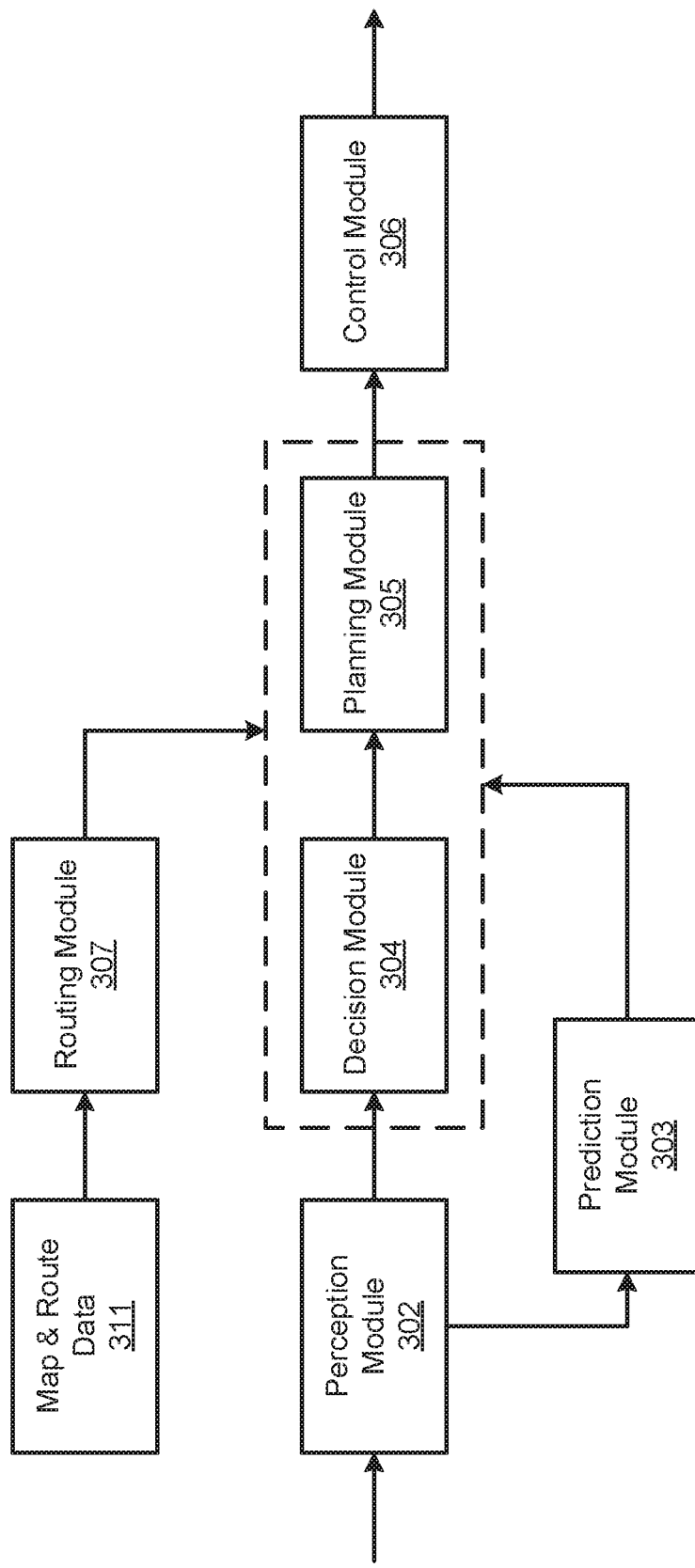

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and natural deceleration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312 or natural deceleration profile 313, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, natural deceleration module 308 is configured to plan a natural deceleration trajectory to control the ADV to naturally slow down based on nature deceleration profile 313 associated with the ADV. The natural deceleration profile 313 may be generated based on driving statistics of a large number of vehicles similar to the ADV, for example, by data analytics system 103. The natural deceleration module 308 may be implemented as a part of planning module 305.

In response to a request for driving in a natural deceleration mode, a current speed of the ADV is determined. A speed guideline is generated based on a predetermined natural deceleration profile associated with the ADV in view of the current speed of the ADV. A speed planning operation is performed by optimizing a total cost function based on the speed guideline to determine speeds of a plurality of trajectory points along a trajectory planned to drive the ADV. A number of control commands are generated based on the speed planning operation to control the ADV with the planned speeds along the trajectory, such that the ADV naturally slows down according to the predetermined natural deceleration profile.

In one embodiment, the predetermined natural deceleration profile is generated by allowing a sample vehicle that is of a same type as the ADV to naturally decelerate under neutral road conditions (e.g., on a flat, well-surfaced road) from a maximum speed (e.g., 150 km/h) to a full stop without engaging either an accelerator or a brake, and measuring and recording a time-speed relationship during the natural deceleration. In one embodiment, the predetermined natural deceleration profile comprises a reference line (e.g., a curve) that approximately represents the recorded time-speed relationship during the natural deceleration.

In one embodiment, generating a planned trajectory that minimizes the total cost function comprises using Quadratic programming (QP) to minimize the total cost function. In one embodiment, the total cost function further comprises a total path cost function. In one embodiment, the total speed cost function comprising at least an acceleration cost term, a jerk cost term, and an obstacle cost term when the ADV is planned to be in a speed-up state.

Figure 4:
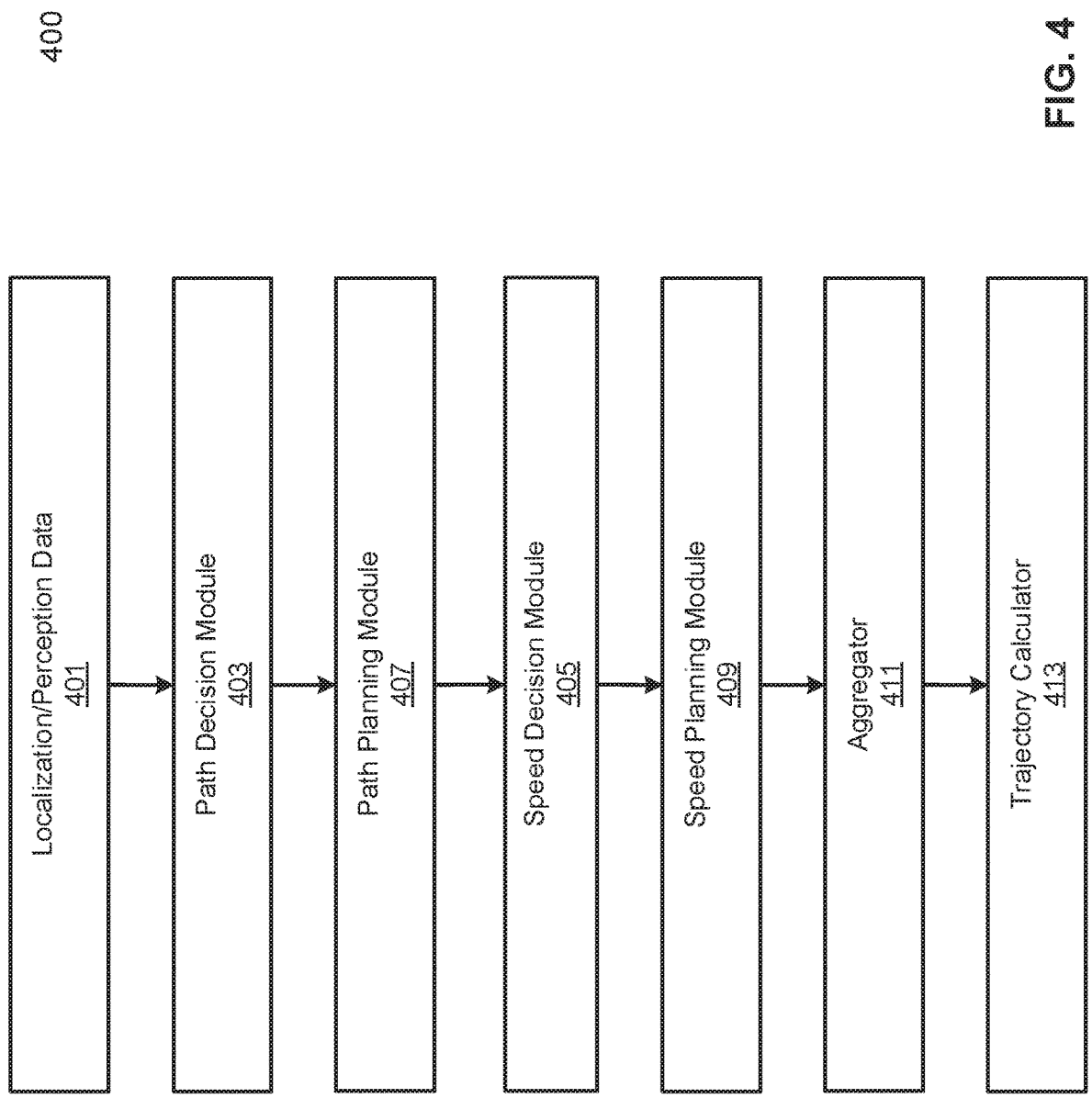
FIG. 4 is a block diagram illustrating an example of a decision and planning system according to one embodiment.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a deceleration state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, conventionally, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed'' denotes a jerk value, or a derivative of the acceleration value or a cost to change the acceleration between two adjacent points, and distance denotes a distance from the ST point to the destination location. Here, the speed costs module calculates a station-time graph by minimizing the speed cost using a quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5:
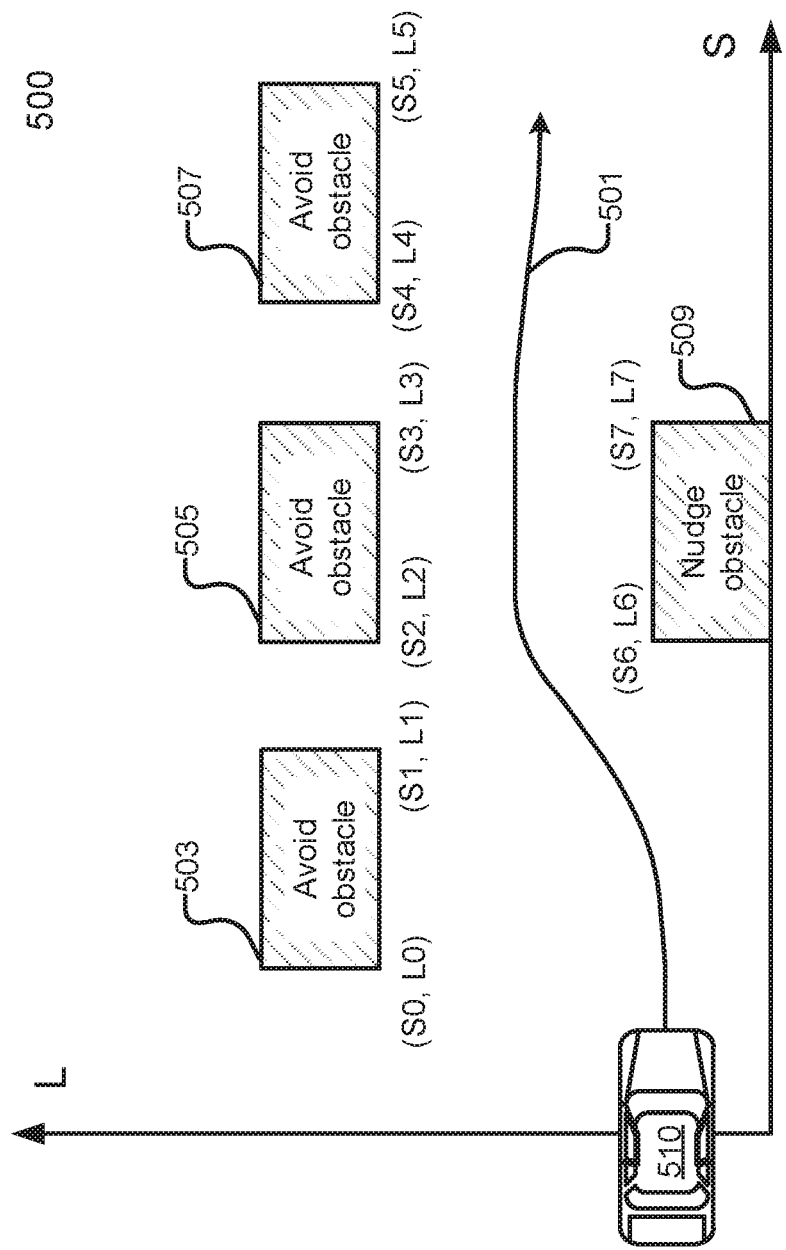
FIG. 5 is a block diagram illustrating a station-lateral map according to one embodiment.

FIG. 5 is a block diagram illustrating a station-lateral map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely) obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

Figure 6A:
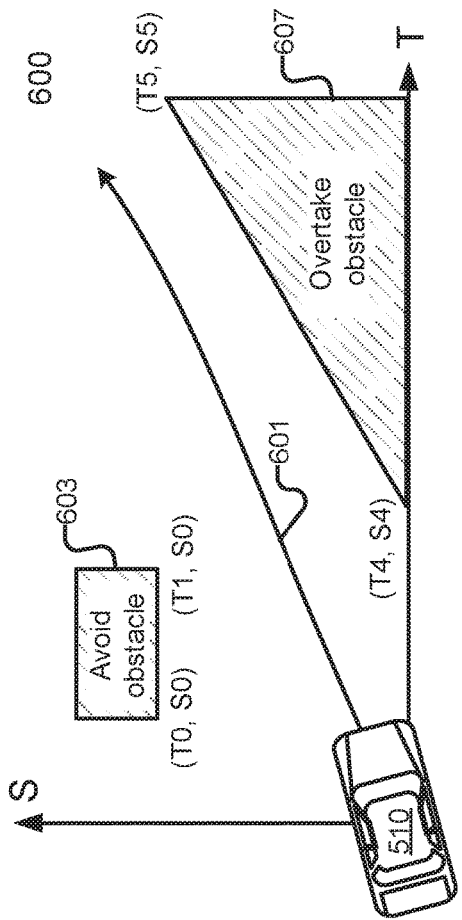
FIGS. 6A and 6B are block diagrams illustrating station-time maps according to some embodiments.
Figure 6B:
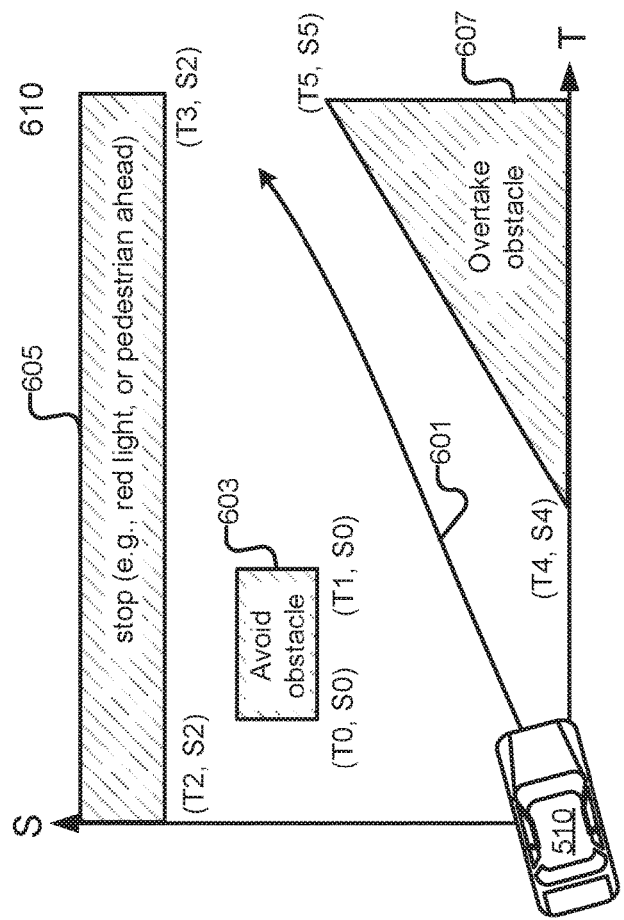

FIGS. 6A and 6B are block diagrams illustrating station-time maps according to some embodiments. Referring to FIG. 6A, ST graph 600 has a station (or S) vertical axis and a time (or T) horizontal axis. ST graph 600 includes curve 601 and obstacles 603-607. As described above, curve 601 on station-time graph indicates, at what time and how far away is the ADV from a station point. For example, a (T, S)=(10000, 150) can denote in 10000 milliseconds, an ADV would be 150 meters from the stationary point (i.e., a reference point). In this example, obstacle 603 may be a building/structure to be avoided and obstacle 607 may be an artificial barrier corresponding to a decision to overtake a moving vehicle.

Referring to FIG. 6B, in this scenario, artificial barrier 605 is added to the ST graph 610 as a constraint. The artificial barrier can be examples of a red light or a pedestrian in the pathway that is at a distance approximately S2 from the station reference point, as perceived by the ADV. Barrier 705 corresponds to a decision to "stop" the ADV until the artificial barrier is removed at a later time (i.e., the traffic light changes from red to green, or a pedestrian is no longer in the pathway).

Figure 7:
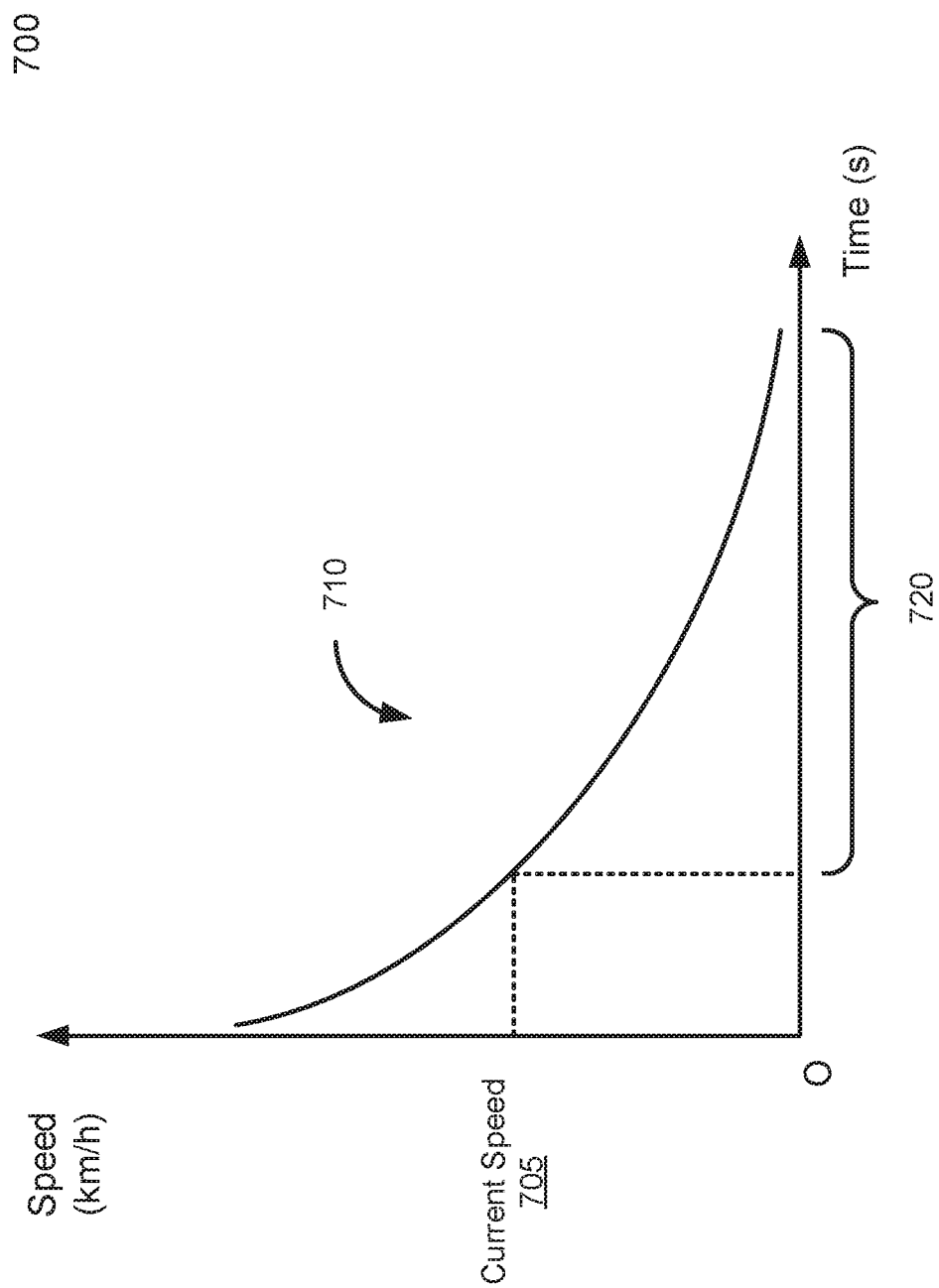
FIG. 7 is a diagram illustrating an example natural deceleration profile according to one embodiment.

Referring to FIG. 7, a diagram illustrating an example natural deceleration profile 700 according to one embodiment is shown. The natural deceleration profile 700 may correspond to an ADV of a particular type/model. ADVs of different types or models are associated with their respective, different natural deceleration profiles, which need to be generated individually for each type or model. Generally, the predetermined natural deceleration profile is generated by allowing a sample vehicle that is of a particular type or model to naturally decelerate under neutral road conditions (e.g., on a flat, well-surfaced road) from a maximum speed (e.g., 150 km/h) to a full stop without engaging either an accelerator or a brake, and measuring and recording a time-speed relationship during the natural deceleration. In the embodiment shown, the natural deceleration profile 700 includes a reference line 710, in this example, a speed curve, that approximately represents the recorded time-speed relationship during the natural deceleration. Curve 710 represents changing of the speed in time during the natural deceleration driving. It should be appreciated that because the time-speed relationship during the natural deceleration from the maximum speed down to zero speed is recorded in the natural deceleration profile, the time-speed relationship during the natural deceleration between any two arbitrary speeds can be ascertained using the natural deceleration profile.

In one embodiment, referring to FIG. 7, based on a current speed 705 of the ADV, a lookup operation is performed on the speed curve 710 to identify a section 720 of the speed curve. The section 720 of the speed curve 710 is utilized as a speed guideline for speed planning during the natural deceleration driving starting from the current speed 705 as described above.

Figure 8:
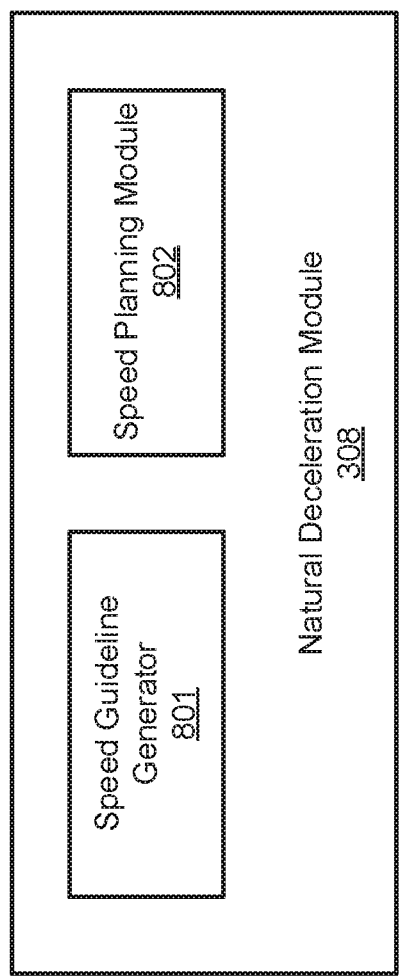
FIG. 8 is a block diagram illustrating various modules usable with embodiments of the disclosure.

FIG. 8 is a block diagram illustrating an example of a natural deceleration module according to one embodiment. Referring to FIG. 8, natural deceleration module 308 includes, amongst others, a speed guideline generator 801 and a speed planning module 802. In response to a request for natural deceleration, speed guideline generator 801 performs a lookup in a natural deceleration profile associated with the ADV based on a current speed of the ADV. A section of the natural deceleration speed curve is obtained from the natural deceleration profile based on the current speed. The section of the natural deceleration speed curve is utilized as a part of the speed reference during the speed planning performed by speed planning module 802 to determine the speeds along a path planned to drive the ADV. Thereafter, the control commands may be issued to control the speeds of the ADV so that the ADV moves as it is naturally slowing down.

Figure 9:
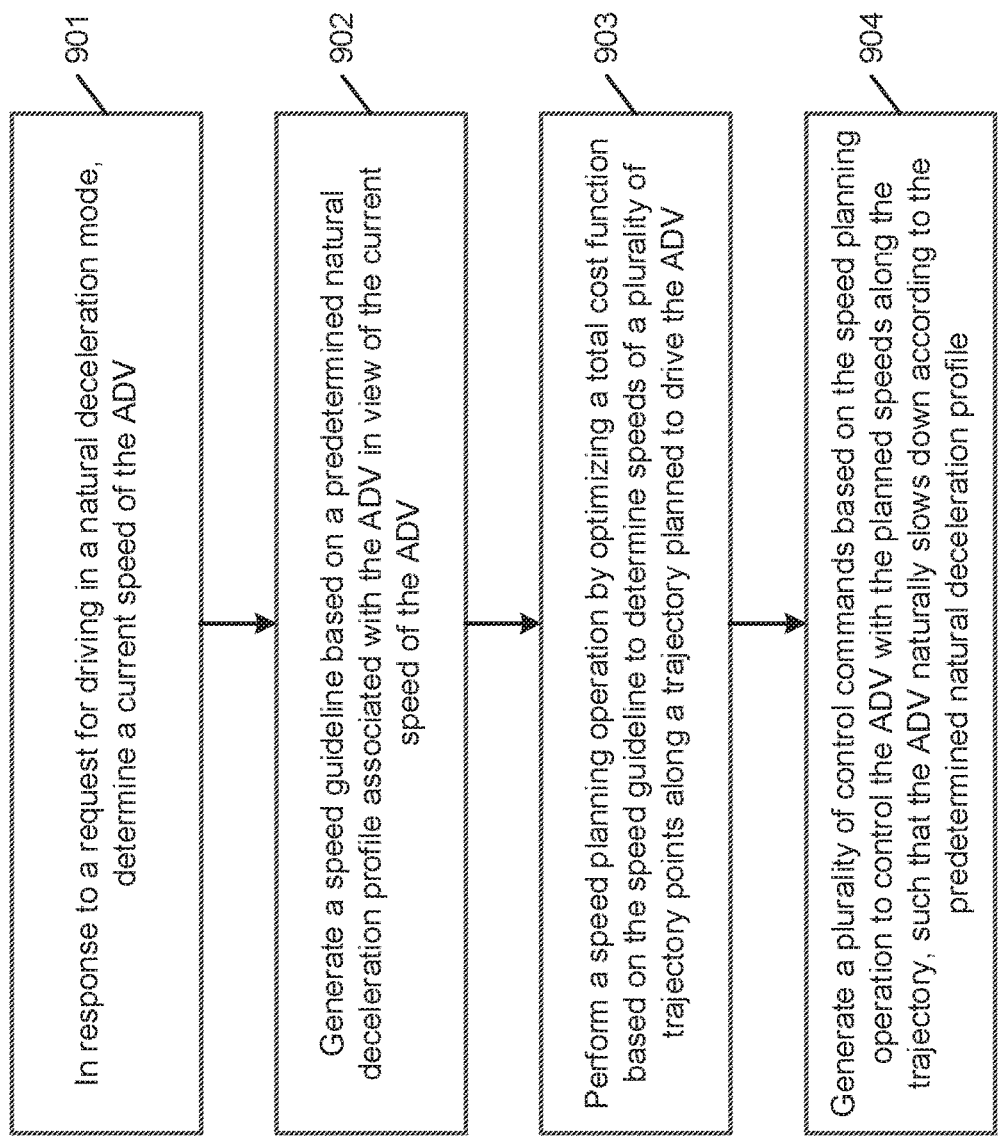
FIG. 9 is a flowchart illustrating an example method for planning a deceleration trajectory based on a natural deceleration profile for an autonomous driving vehicle (ADV) according to one embodiment.

FIG. 9 is a flow diagram illustrating a process of operating an autonomous driving vehicle according to one embodiment. Process 900 may be performed by processing logic which may include software, hardware, or a combination thereof. For example, process 900 may be performed by system 300 of FIG. 3A, particularly by natural deceleration module 308, planning module 305, and/or control module 306. Referring to FIG. 9, at block 901, in response to a request for driving in a natural deceleration mode, a current speed of the ADV is determined. At block 902, a speed guideline is generated based on a predetermined natural deceleration profile associated with the ADV in view of the current speed of the ADV. At block 903, processing logic performs a speed planning operation by optimizing a total cost function based on the speed guideline to determine the speeds of the trajectory points along a trajectory planned to drive the ADV. At block 904, various control commands are generated based on the speed planning operation to control the ADV with the planned speeds along the trajectory, such that the ADV naturally slows down according to the predetermined natural deceleration profile.

In one embodiment, the total cost function includes at least a total speed cost function. The total speed cost function comprises at least a deviation-from-natural-deceleration cost term and an obstacle cost term when the ADV is planned to be in a deceleration state. The deviation-from-natural-deceleration cost term represents a difference between a planned deceleration profile and a predetermined natural deceleration profile.

For example, if the speed of the ADV is 50 km/h, it may be ascertained from the natural deceleration profile that counting from the time the vehicle is traveling at 50 km/h, the vehicle should be traveling at 47 km/s after 1 second with natural deceleration, and at 45 km/s after 2 seconds with natural deceleration, etc. The greater the difference between the planned deceleration profile and the natural deceleration profile, the larger the deviation-from-natural-deceleration cost term. Therefore, it should be appreciated that compared to the conventional total speed cost function described above, the non-obstacle related cost terms (e.g., the acceleration cost, the jerk cost) in the conventional total speed cost function are replaced with the deviation-from-natural-deceleration cost term in the total speed cost function for planning a deceleration trajectory based on the natural deceleration profile. Further, because the obstacle cost term is preserved in the total speed cost function, the planned trajectory would still avoid potential collisions.

In one embodiment, the total cost function further comprises a total path cost function. In one embodiment, the total speed cost function comprising at least an acceleration cost term, a jerk cost term, and an obstacle cost term when the ADV is planned to be in a speed-up state.

Therefore, with the assistance of embodiments of the disclosure, a planned trajectory can be generated that allows an ADV to decelerate in a natural fashion without engaging any acceleration or brake. Passenger comfort can be improved accordingly.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   in response to a request for driving in a natural deceleration mode, determining a current speed of the ADV;
   generating a speed guideline based on a predetermined natural deceleration profile associated with the ADV to naturally decelerate in view of the current speed of the ADV;
   performing a speed planning operation by optimizing a total cost function based on the speed guideline to determine speeds of a plurality of trajectory points along a trajectory planned to drive the ADV;
   generating a plurality of control commands based on the speed planning operation to control the ADV with the determined speeds along the trajectory; and
   decelerating, based on the plurality of control commands, the ADV according to the predetermined natural deceleration profile.

2. The method of claim 1, wherein the predetermined natural deceleration profile was generated by allowing a sample vehicle that is of a same type as the ADV to naturally decelerate under neutral road conditions from a maximum speed to a full stop without engaging either an accelerator or a brake, and measuring and recording a time-speed relationship during the natural deceleration.

3. The method of claim 2, wherein the predetermined natural deceleration profile comprises a reference line that approximately represents the recorded time-speed relationship during the natural deceleration.

4. The method of claim 1, wherein the total cost function comprises at least a total speed cost function having at least a deviation-from-natural-deceleration cost term and an obstacle cost term when the ADV is operated in the natural deceleration mode.

5. The method of claim 1, wherein optimizing the total cost function comprises using Quadratic programming (QP) to minimize the total cost function.

6. The method of claim 1, wherein the total cost function further comprises a total path cost function to determine a total path cost for the planned trajectory.

7. The method of claim 1, wherein the total cost function comprises at least an acceleration cost term, a jerk cost term, and an obstacle cost term when the ADV is planned to be in a speed-up state.

8. A non-transitory machine-readable medium having instructions stored therein, which when executed by a processor, cause the processor to perform operations of operating an autonomous driving vehicle (ADV), the operations comprising:
   in response to a request for driving in a natural deceleration mode, determining a current speed of the ADV;
   generating a speed guideline based on a predetermined natural deceleration profile associated with the ADV to naturally decelerate in view of the current speed of the ADV;
   performing a speed planning operation by optimizing a total cost function based on the speed guideline to determine speeds of a plurality of trajectory points along a trajectory planned to drive the ADV;
   generating a plurality of control commands based on the speed planning operation to control the ADV with the determined speeds along the trajectory; and
   decelerating, based on the plurality of control commands, the ADV according to the predetermined natural deceleration profile.

9. The machine-readable medium of claim 8, wherein the predetermined natural deceleration profile was generated by allowing a sample vehicle that is of a same type as the ADV to naturally decelerate under neutral road conditions from a maximum speed to a full stop without engaging either an accelerator or a brake, and measuring and recording a time-speed relationship during the natural deceleration.

10. The machine-readable medium of claim 9, wherein the predetermined natural deceleration profile comprises a reference line that approximately represents the recorded time-speed relationship during the natural deceleration.

11. The machine-readable medium of claim 8, wherein the total cost function comprises at least a total speed cost function having at least a deviation-from-natural-deceleration cost term and an obstacle cost term when the ADV is operated in the natural deceleration mode.

12. The machine-readable medium of claim 9, wherein optimizing the total cost function comprises using Quadratic programming (QP) to minimize the total cost function.

13. The machine-readable medium of claim 9, wherein the total cost function further comprises a total path cost function to determine a total path cost for the planned trajectory.

14. The machine-readable medium of claim 8, wherein the total speed cost function comprises at least an acceleration cost term, a jerk cost term, and an obstacle cost term when the ADV is planned to be in a speed-up state.

15. A data processing system, comprising:
   a processor; and
   a memory coupled to the processor to store instructions, which when executed by the processor, cause the processor to perform operations of operating an autonomous driving vehicle (ADV), the operations including
      in response to a request for driving in a natural deceleration mode, determining a current speed of the ADV,
      generating a speed guideline based on a predetermined natural deceleration profile associated with the ADV to naturally decelerate in view of the current speed of the ADV;
      performing a speed planning operation by optimizing a total cost function based on the speed guideline to determine speeds of a plurality of trajectory points along a trajectory planned to drive the ADV;
      generating a plurality of control commands based on the speed planning operation to control the ADV with the determined speeds along the trajectory; and
      decelerating, based on the plurality of control commands, the ADV according to the predetermined natural deceleration profile.

16. The system of claim 15, wherein the predetermined natural deceleration profile was generated by allowing a sample vehicle that is of a same type as the ADV to naturally decelerate under neutral road conditions from a maximum speed to a full stop without engaging either an accelerator or a brake, and measuring and recording a time-speed relationship during the natural deceleration.

17. The system of claim 16, wherein the predetermined natural deceleration profile comprises a reference line that approximately represents the recorded time-speed relationship during the natural deceleration.

18. The system of claim 15, wherein the total cost function comprises at least a total speed cost function having at least a deviation-from-natural-deceleration cost term and an obstacle cost term when the ADV is operated in the natural deceleration mode.

19. The system of claim 15, wherein optimizing the total cost function comprises using Quadratic programming (QP) to minimize the total cost function.

20. The system of claim 15, wherein the total cost function further comprises a total path cost function to determine a total path cost for the planned trajectory.

* * * * *